United States Patent [19]
Lin et al.

[11] Patent Number: 5,712,938
[45] Date of Patent: Jan. 27, 1998

[54] OPTICAL FIBER CONNECTOR

[75] Inventors: Samuel I-En Lin, Miao-Li Hsien; S. H. Shan, Hsinchu Hsien, both of Taiwan

[73] Assignee: Tai Jin Mold Mfg. Co., Taipei, Taiwan

[21] Appl. No.: 655,643

[22] Filed: May 30, 1996

[51] Int. Cl.⁶ .................................................. G02B 6/38
[52] U.S. Cl. .......................... 385/59; 385/60; 385/70; 385/71; 385/77; 385/78; 385/86; 385/139
[58] Field of Search .............................. 385/59, 60, 66, 385/70, 71, 72, 76, 77, 78, 84, 86, 87, 139

[56] References Cited

U.S. PATENT DOCUMENTS

| | | | |
|---|---|---|---|
| 4,979,792 | 12/1990 | Weber et al. | 385/78 X |
| 5,016,968 | 5/1991 | Hammond et al. | 385/78 X |
| 5,041,025 | 8/1991 | Haitmanek | 439/681 |
| 5,202,949 | 4/1993 | Hileman et al. | 385/134 |
| 5,212,752 | 5/1993 | Stephenson et al. | 385/78 |
| 5,259,052 | 11/1993 | Briggs et al. | 385/78 |
| 5,265,181 | 11/1993 | Chang | 385/75 |
| 5,289,554 | 2/1994 | Cubukciyan et al. | 385/76 |
| 5,363,459 | 11/1994 | Hultermans | 385/60 |
| 5,521,997 | 5/1996 | Rovenolt et al. | 385/77 |

*Primary Examiner*—Brian Healy
*Attorney, Agent, or Firm*—Birch, Stewart, Kolasch & Birch, LLP

[57] ABSTRACT

An optical fiber connector comprises a main body, two ferrules, an adapter, a keying element and a shroud. The main body has a first side wall, a second side wall, a third side wall opposite the first side wall, a fourth side wall opposite the second side wall, two latching arms respectively extending out from the first and third side walls, and two receiving bases attached to the second side wall. Each of the latching arms has at least one latching lug. The two ferrules are received in the receiving bases. The adapter is connected to the fourth side wall of the main body, wherein an optical fiber cable extends out from the adapter and is divided into two parts in an interior of the main body, and the two parts of the optical fiber cable are connected to the ferrules. The shroud movably envelops the receiving bases and has two through holes corresponding to the ferrules and at least one latching hole corresponding to the latching lug. The keying element is rotatably received in a receiving cavity of the shroud and has an indicating means to indicate the present operation type of the optical fiber connector.

8 Claims, 11 Drawing Sheets

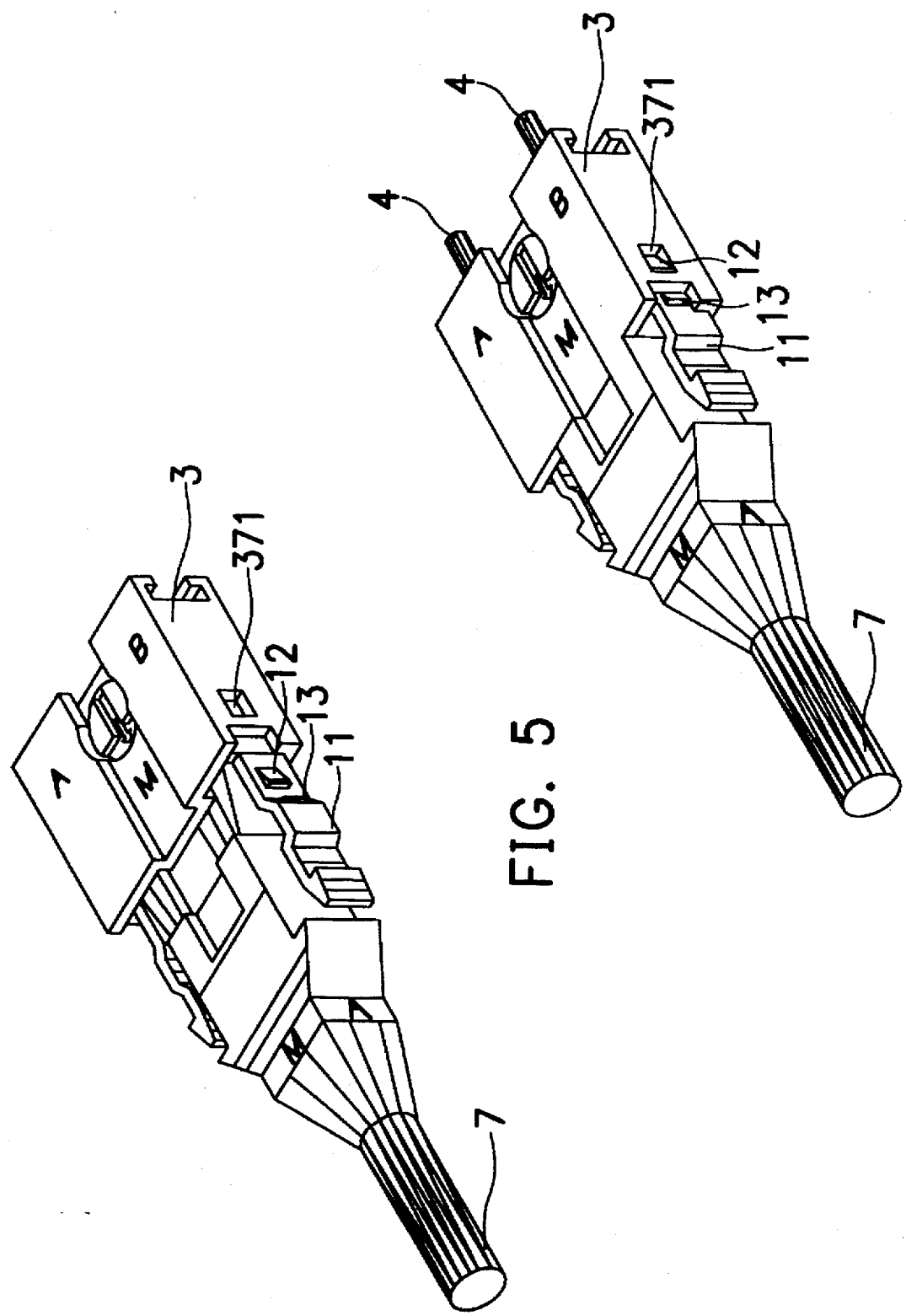

OPTICAL FIBER CONNECTOR

BACKGROUND OF THE INVENTION

1. Field of the Invention

The present invention relates to an optical fiber connector, particular to an optical fiber connector which has fewer parts and more functions than the prior art and can be easily assembled.

2. Description of Prior Art

Many patents are relevant to the optical fiber connector. However, their corresponding products still have many drawbacks.

U.S. Pat. No. 4,979,792 pertains to an optical fiber connector which has three replaceable keying elements to indicate its present operation type. However, replacing the keying elements is troublesome. Also, the three different keying elements result in high manufacturing cost.

U.S. Pat. No. 5,202,949 pertains to an optical fiber connector which has a separable and independent dust cover. However, the dust cover has a large size and a complex configuration. This increases the cost of materials and manufacturing. Besides, the dust cover is easily lost if it is not in use and is put at somewhere the user cannot remember.

U.S. Pat. No. 5,259,052 pertains to an optical fiber connector, in which a shroud is provided with two openings so that two ferrules can stick out therefrom. However, dust may intrude into the openings and stain the ferrules. The optical fiber connector also has three replaceable keying elements for indicating its present operation type. Such three keying elements result in high manufacturing cost, and two of them, which temporarily are not in use, are easily lost.

U.S. Pat. No. 5,041,025 and 5,265,181 only adopt one keying element. This can considerably improve the above problem. However, the keying element needs to be pulled out, changed with another surface upward, and then inserted back to the connector to indicate the present operation type. The process seems too complex.

SUMMARY OF THE INVENTION

An object of this invention is to provide an optical fiber connector to solve the problems indicated above. The optical fiber connector comprises a main body, two ferrules, an adapter, a keying element and a shroud. The main body has a first side wall, a second side wall, a third side wall opposite the first side wall, a fourth side wall opposite the second side wall, two latching arms respectively extending out from the first and third side walls, and two receiving bases attached to the second side wall. Each of the latching arms has at least one latching lug. The two ferrules are received in the receiving bases. The adapter is connected to the fourth side wall of the main body, wherein an optical fiber cable extends out from the adapter and is divided into two parts in an interior of the main body, and the two parts of the optical fiber cable are connected to the ferrules. The shroud movably envelops the receiving bases and has two through holes corresponding to the ferrules and at least one latching hole corresponding to the latching lug. The keying element is rotatably received in a receiving cavity of the shroud and has an indicating means to indicate the present operation type of the optical fiber connector.

BRIEF DESCRIPTION OF THE DRAWINGS

The present invention can be more fully understood by reading the subsequent detailed description and examples with references made to accompanying drawings, wherein:

FIG. 5 is a perspective diagram of the optical fiber connector according to this invention;

FIG. 11 shows the ferrules of the optical fiber connector protruding.

DETAILED DESCRIPTION OF THE PREFERRED EMBODIMENT

Figure 1A:
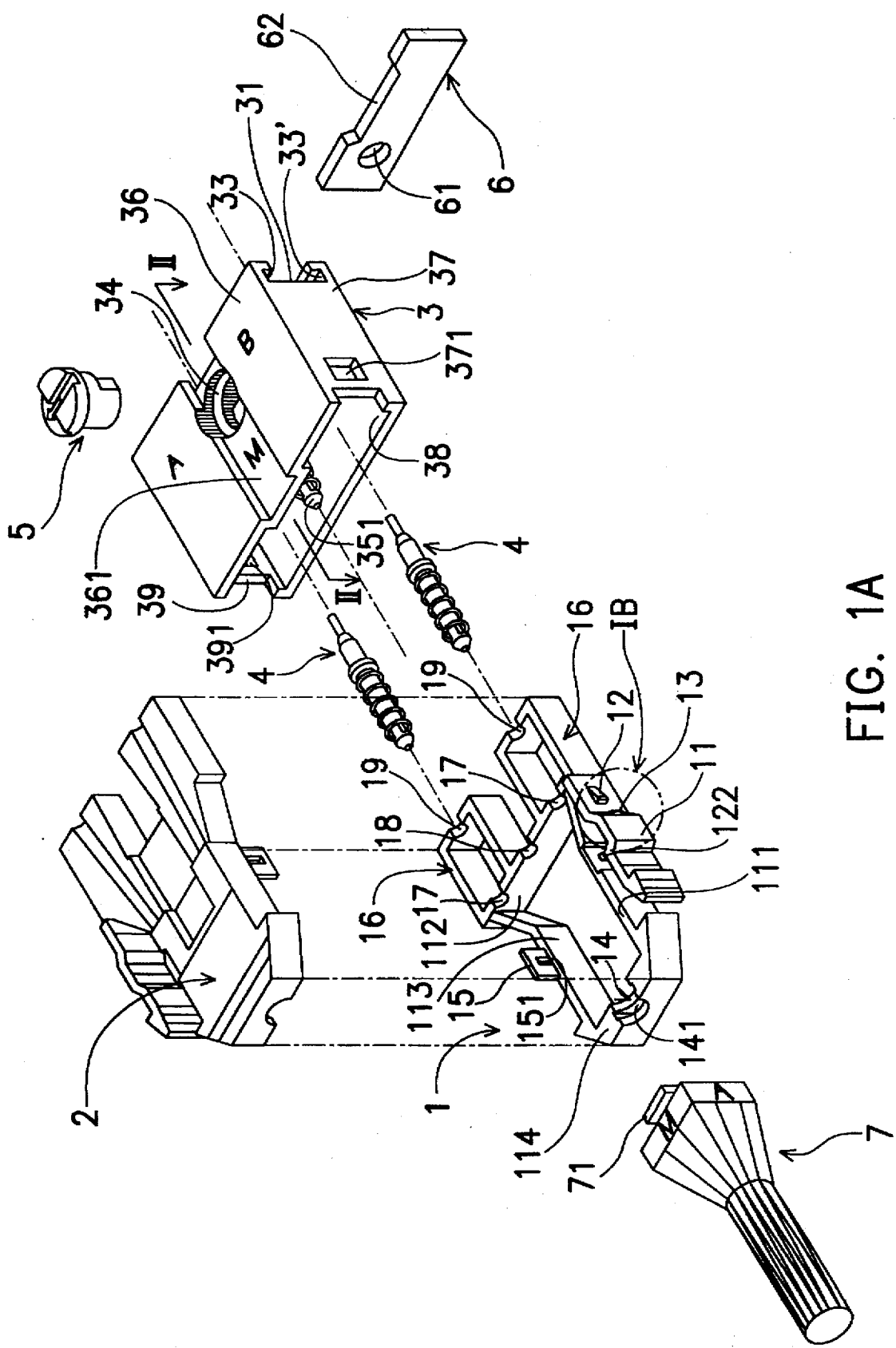
FIG. 1A is a perspective exploded diagram of an optical fiber connector according to this invention.
Figure 1B:
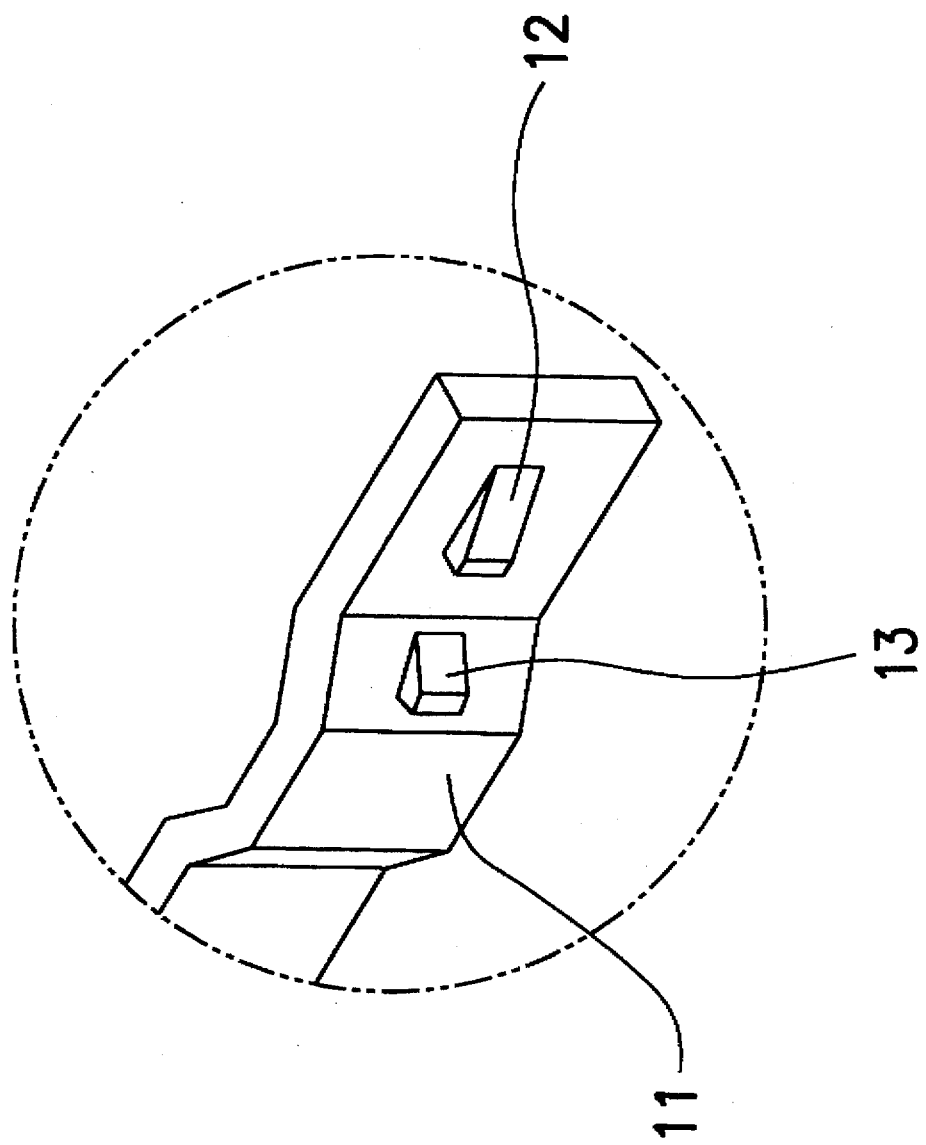
FIG. 1B is an enlarged view of FIG. 1A taken in the encircled area IB.

Please refer to FIGS. 1A and 1B, wherein the optical fiber connector according to this invention comprises a first body portion 1, a second body portion 2, a shroud 3, two ferrules 4, a keying element 5, a dust cover 6 and an adapter 7.

The first body portion 1 and the second body portion 2 are complementary to each other in shape and can be assembled together to form a hollow main body of the optical fiber connector. The first body portion 1 is like a box without a cover, and therefore has four side walls—a first side wall 111, a second side wall 112, a third side wall 113 and a fourth side wall 114. A latching arm 11 extends out from the first side wall 11. A first latching lug 12 and a second latching lug 13 are provided on the latching arm 11, while a third latching arm 122 is provided on the first side wall and is shaded by the latching arm 11. A first arcuate groove 18 and two second arcuate grooves 17 are provided on the second side wall 112 onto which two receiving bases 16 are attached. Also, two third arcuate grooves 19 are provided on the receiving bases 16 and respectively aligned with the second arcuate grooves 17. A latch 15 having a latching hole 151 is attached to the third side wall 113. An arcuate groove 14 is provided on the fourth side wall 114 while a rectangular groove 141 is further formed in the arcuate groove 14.

As mentioned above, the shape of the second body portion 2 is complementary to that of the first body portion 1. Actually the second body portion 2 has the same main parts as the first body portion 1 has, and what are the significant differences between the two body portions 1, 2 are the positions of their elastic arms, latches and third latching lugs opposite each other. Accordingly the parts of the second portion are given the same names as those of the first body portion hereinafter, and the detailed descriptions of the second body portion 2 are omitted here.

The shroud 3 has a first side plate 36, a second side plate 37, a third side plate 38, a fourth side plate 39 and a front plate 31, wherein the front plate 31 is connected to the first, second, third, fourth side plates 36, 37, 38, 39. The edges of the first and third side plates extend outward to form two side grooves 33, 33'. A passage 361 is provided on the first side plate 36 while a receiving cavity 34 is further formed in the passage 361. Three letters A, M, B are marked around the receiving cavity 34 on the first side plate 36. Two latching holes 371, 391 are respectively provided on the second and fourth side plates 37, 39.

Figure 2:
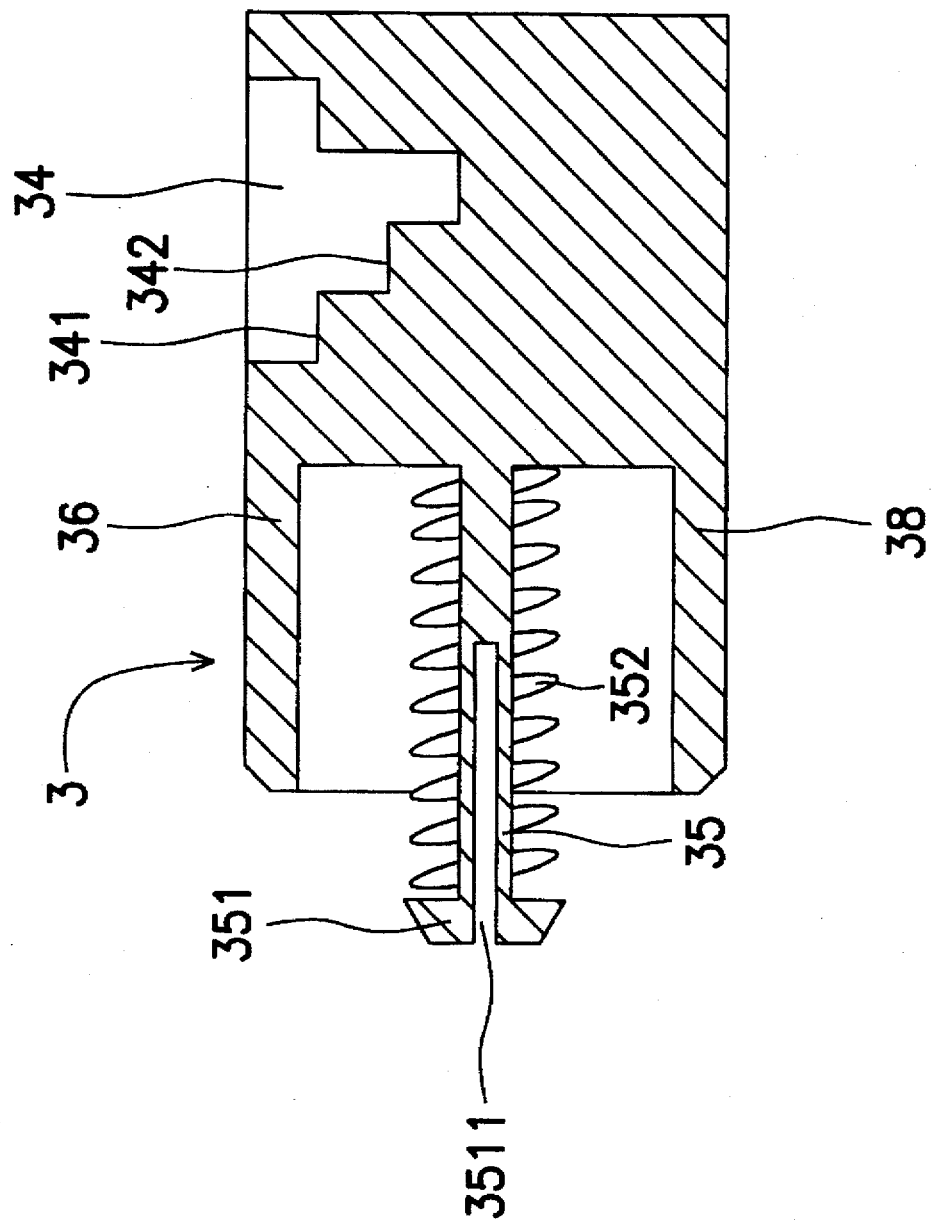
FIG. 2 is a sectional view of a shroud of the optical fiber connector along II—II according to FIG. 1A.

FIG. 2 is a sectional diagram of the shroud along II—II, wherein a solid portion connects the first side plate 36 and the third side plate 38, and the receiving cavity 34 is provided in the solid portion. A central bar 35 extends out from the solid portion. A central bore 3511 penetrates into the central bar 35 and a cap 351 is attached to the end of the central bar 35. Furthermore, a spring 352 is put around the central bar 35 and pressed between the cap 351 and the solid portion.

Figure 3:
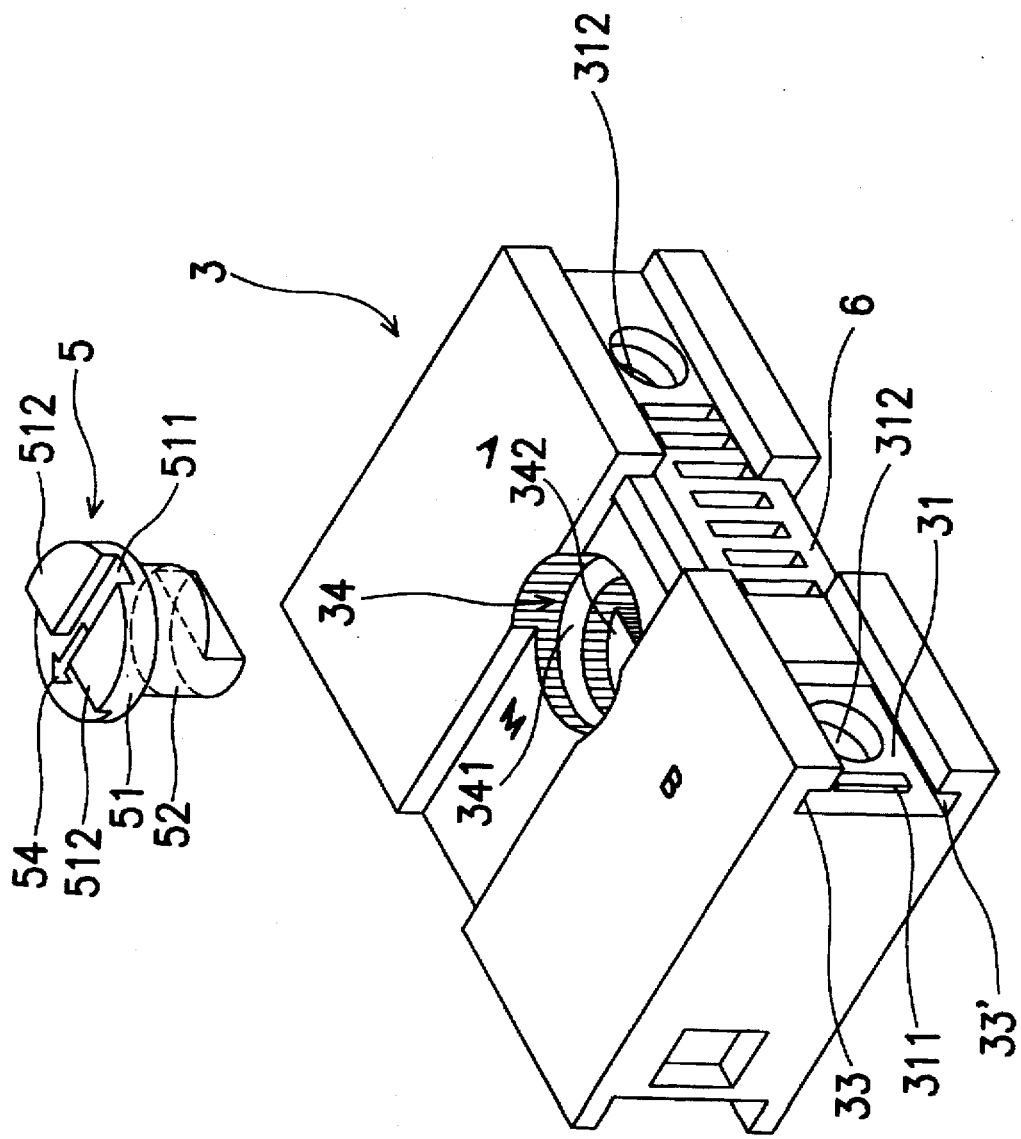
FIG. 3 is a perspective diagram of a keying element and the shroud of the optical fiber connector according to this invention.

Please refer to FIG. 3, wherein the receiving cavity 34 has three portions: the upper and middle portions are circular holes (hereafter called an upper hole and a middle hole), and the diameter of the upper hole is larger than that of the middle hole so that there is an annular terrace 341 next to both the upper hole and the middle hole, and the lower portion is an arcuate hole (hereafter called a lower hole) so that there is an arcuate terrace 342 next to both the middle hole and the lower hole.

The front plate 31 has a stopper 311 and two through holes 312 which allow the two ferrules 4 to pass therethrough.

The keying element 5 has a disk member 51 and a body member 52. Two platforms 512 are provided on the disk member 51 and a channel 511 is formed between the two platforms 512. There is further an arrow symbol provided in the channel 511. The body member 52 is substantially cylindrical and has an arcuate opening formed on its bottom to match the arcuate terrace 342 in the receiving cavity 34.

As shown in FIG. 1A and FIG. 3, the dust cover 6 is substantially a rectangular plate with a through hole 61 provided thereon. One edge of the dust cover has a recess 62 and one surface of the dust cover has a plurality of slots.

Please refer back to FIG. 1A, wherein a rectangular plate 71 is attached to one end of the adapter 7 which has four side surfaces marked with letters A, B, M and S. An aperture is provided at the center of the rectangular plate. Also, an optical fiber cable received in the adapter 7 extends out from the aperture and then is divided into two parts which are connected to the ferrules 4.

Figure 4:
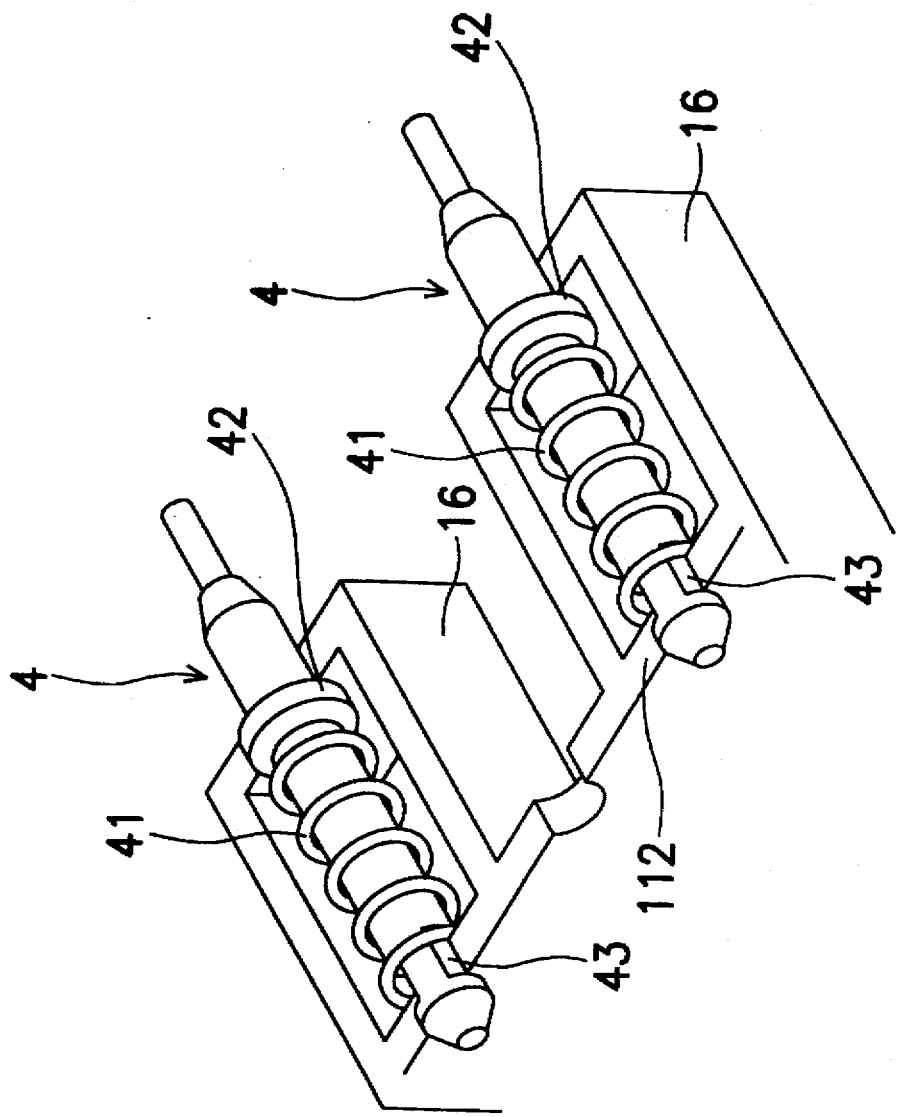
FIG. 4 is a schematic diagram of two ferrules, which are mounted on receiving bases of the optical fiber connector according to this invention.

As shown in FIG. 4, each ferrule 4 has an annular flange 42 provided at its periphery and a notch 43 provided at its end. Also, each of the ferrule 4 has a spring 41 wrapped around itself.

To assemble the optical fiber connector of this invention, the ferrules 4 are mounted on the receiving bases 16 and supported by the second and third arcuate grooves 17, 19, as shown in FIG. 1A and FIG. 4. The springs 41 are pressed between the annular flanges 42 of the ferrules 4 and the second side wall 112 of the first body portion 1 so that one of the inner surfaces of the notch 43 has a space from the second side wall 112. The rectangular plate 71 of the adapter 7 is put in the rectangular groove 141. The dust cover 6 is mounted onto the shroud 3, contacts with the front plate 31 and can move in the grooves 33, 33'. The keying element 5 is closely fitted into the receiving cavity 34 of the shroud 3. Then the first body portion 1 and the second body portion 2 are assembled together by putting the shroud 3 around the receiving bases of the first and second body portion 1, 2, putting the central bar 35 in the first arcuate groove with the cap 351 and the spring 352 against both surfaces of the second side wall, letting the third latching lug of the second body portion engage the latching hole 151 of the first body portion 1, and letting the third latching lug 122 of the first body portion 1 engage the latching hole of the second body portion 2.

Figure 6B:
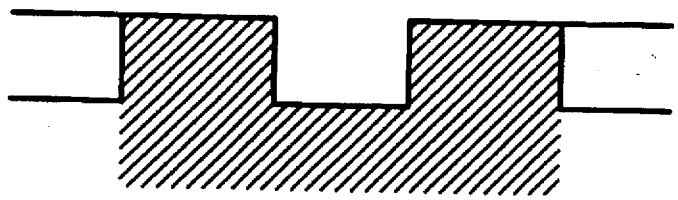
FIGS. 6B, 7B, 8B, 9B respectively are front views of the top surface of the shroud according to FIGS. 6A, 7A, 8A, 9A.
Figure 6A:
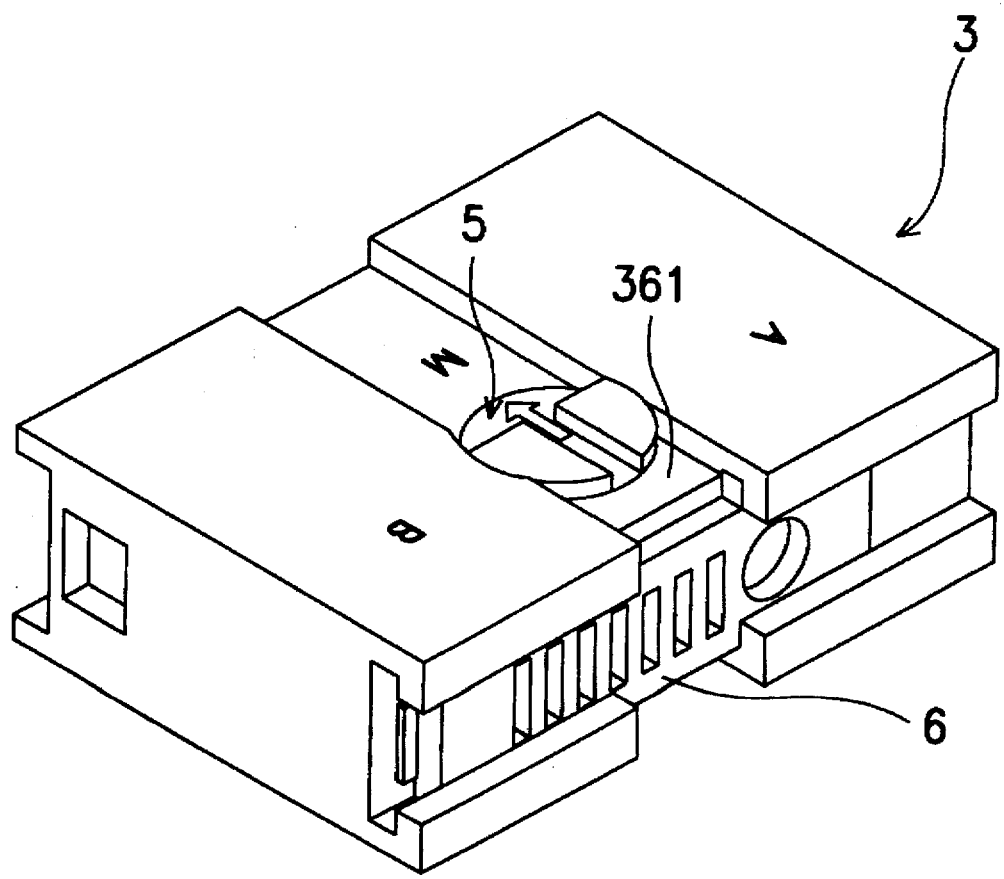
FIGS. 6A, 7A, 8A, 9A are perspective diagrams of the shroud of the optical fiber connector, which is respectively set to operation types M, A, B and S.
Figure 7B:
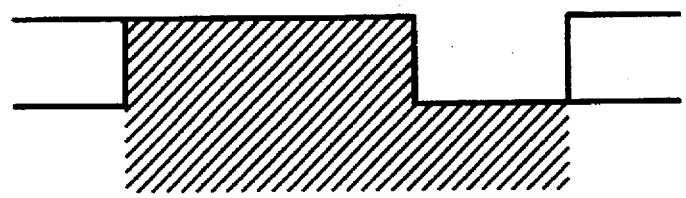
Figure 7A:
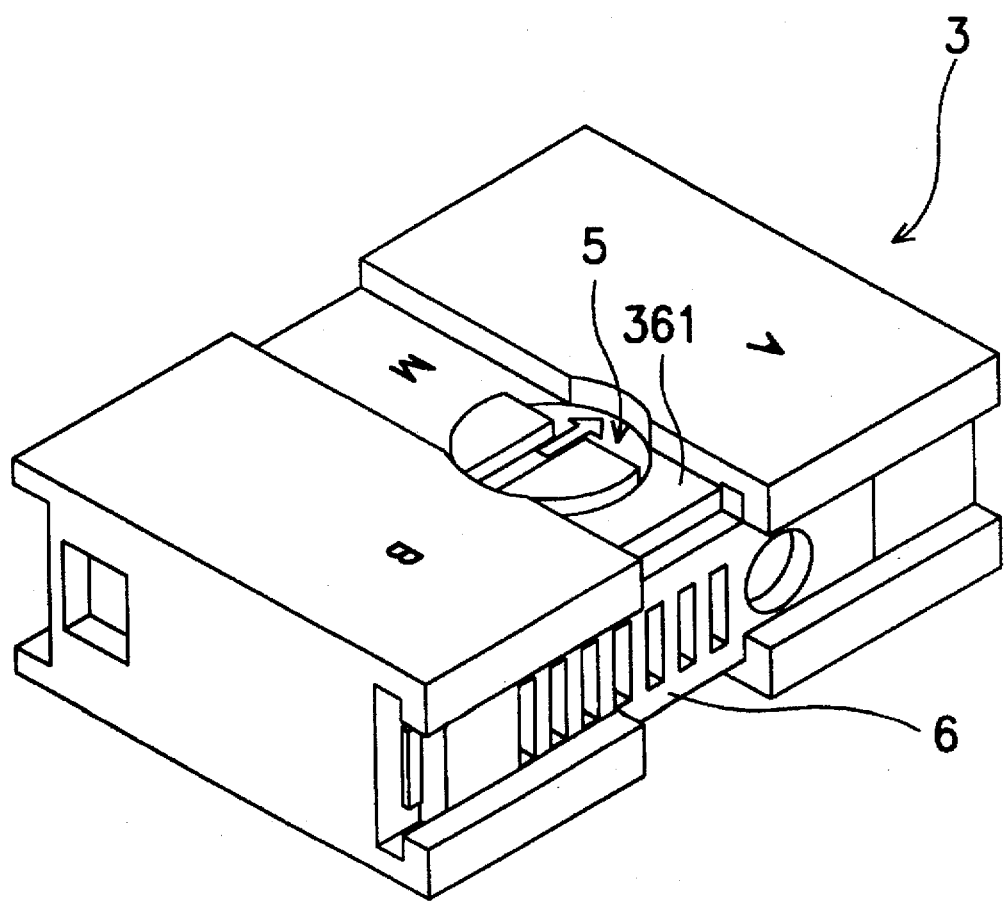
Figure 8B:
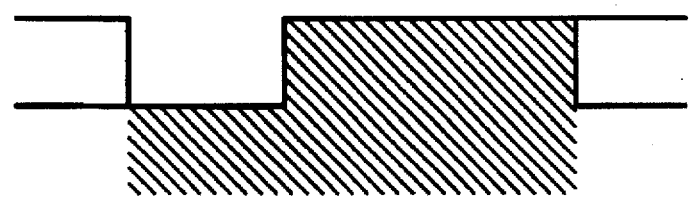
Figure 8A:
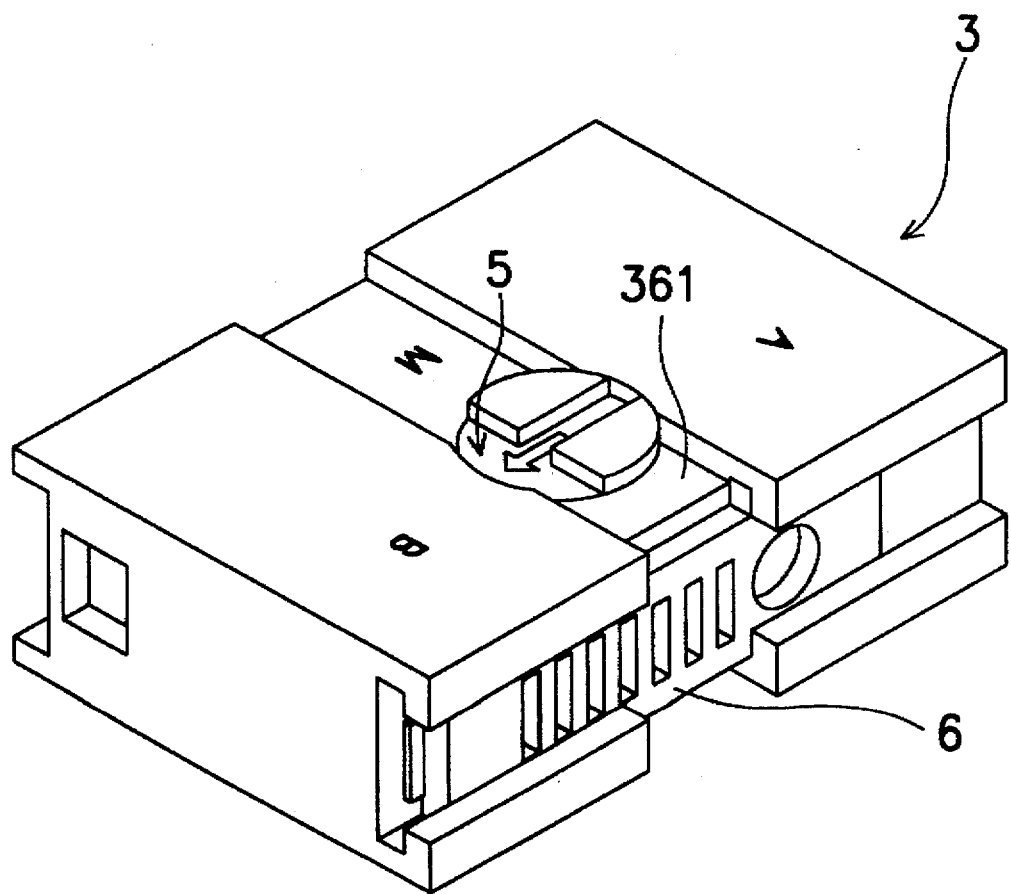

The optical fiber connector of this invention has four letters M, A, B and S marked on the adapter 7 to indicate four different operation types. Also, the arrow symbol on the keying element 5 can indicate the present operation type. As shown in FIG. 6A, the arrow symbol points to the letter M when the connector is operating as an M-type connector. FIG. 6B is a front view of the shroud 3, which shows that a channel is formed at the middle of the top surface of the shroud 3. When the connector is operating as an A-type connector, the keying element 5 can be rotated so that the arrow symbol points to the letter A as shown in FIG. 7A, and a channel is formed on the right of the top surface of the shroud 3 as shown in FIG. 7B. When the connector is operating as a B-type connector, the keying element 5 is rotated so that the arrow symbol points to the letter B as shown in FIG. 8A, and a channel is formed on the left of the top surface of the shroud 3 as shown in FIG. 8B.

Figure 9B:
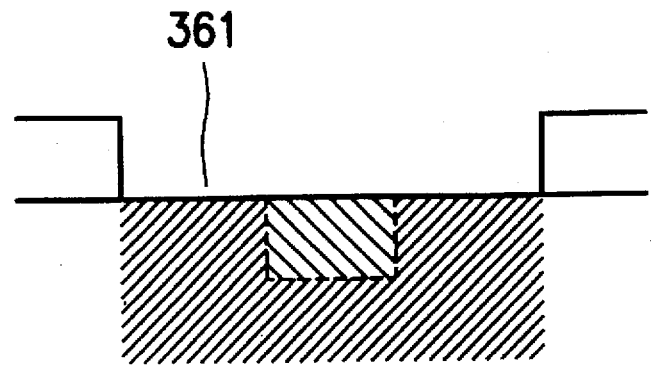
Figure 9A:
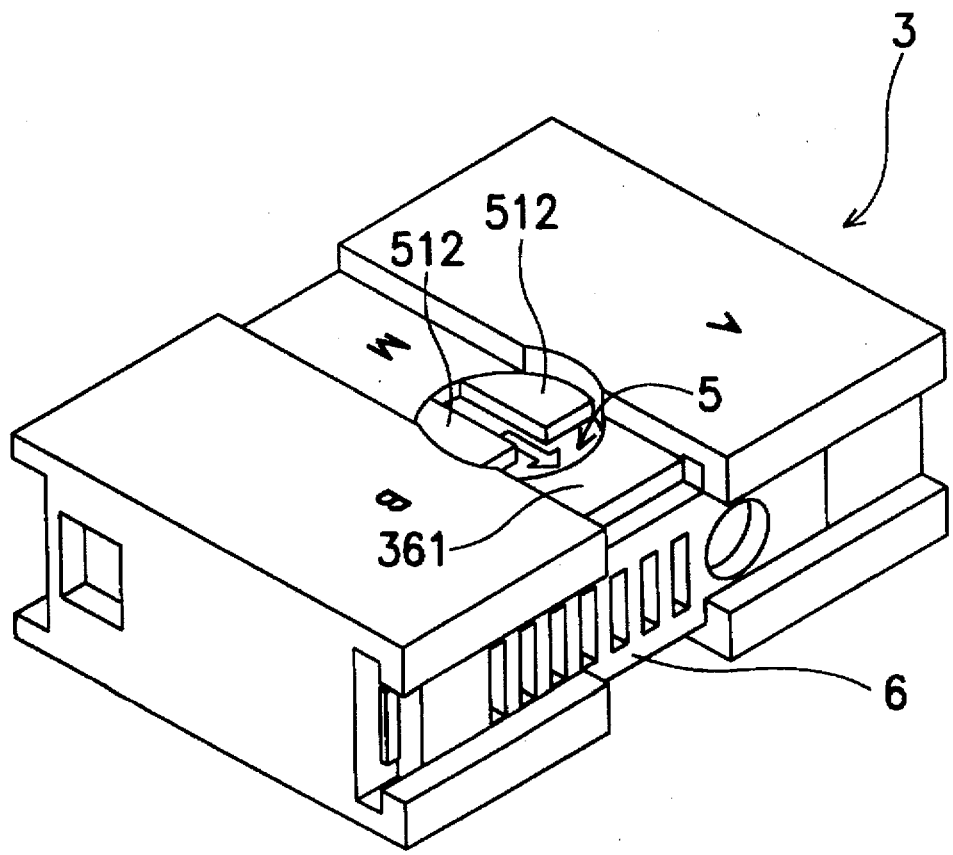

As mentioned above, the receiving cavity 34 has an upper hole, a middle hole and a lower hole. The body member 52 of the keying element 5 is received in the upper and middle holes when the arrow symbol 54 points to one of the letters M, A, B. If the arrow symbol 54 points to the opposite of the letter M, as shown in FIG. 9A, the connector is operating as an S-type connector. The keying element 5 can be entirely depressed into the receiving cavity 34 because the body member 52 can match the middle and lower holes at this time. As shown in FIG. 9B, the passage 361 entirely shows up.

Figure 10B:
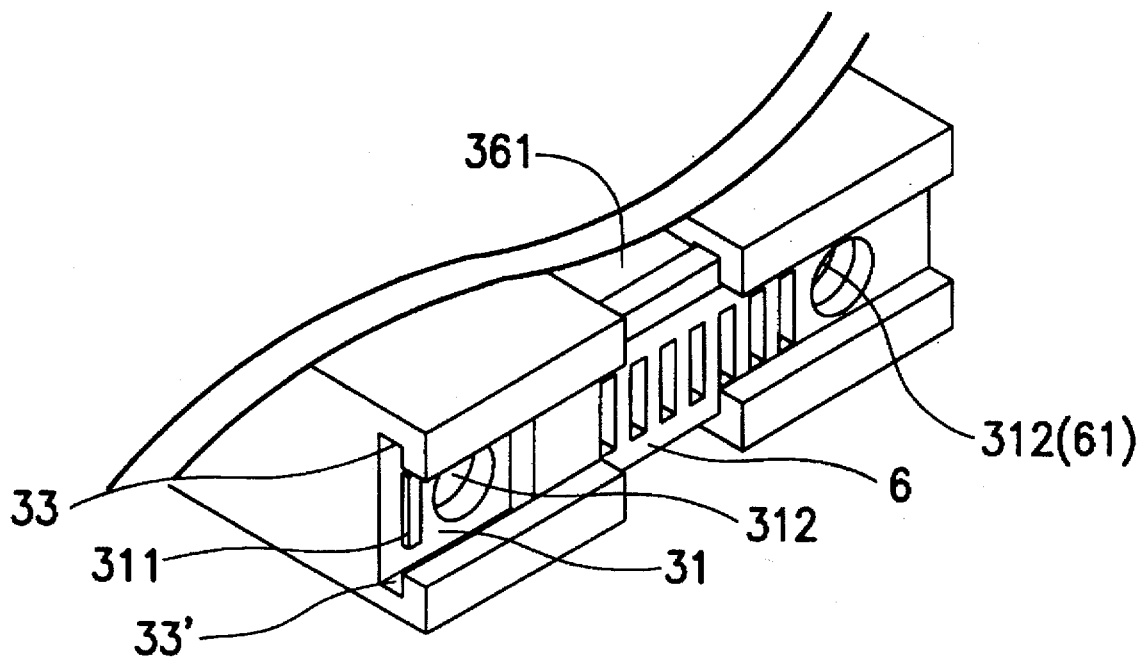
FIG. 10B shows the through holes of the shroud exposed.
Figure 10A:
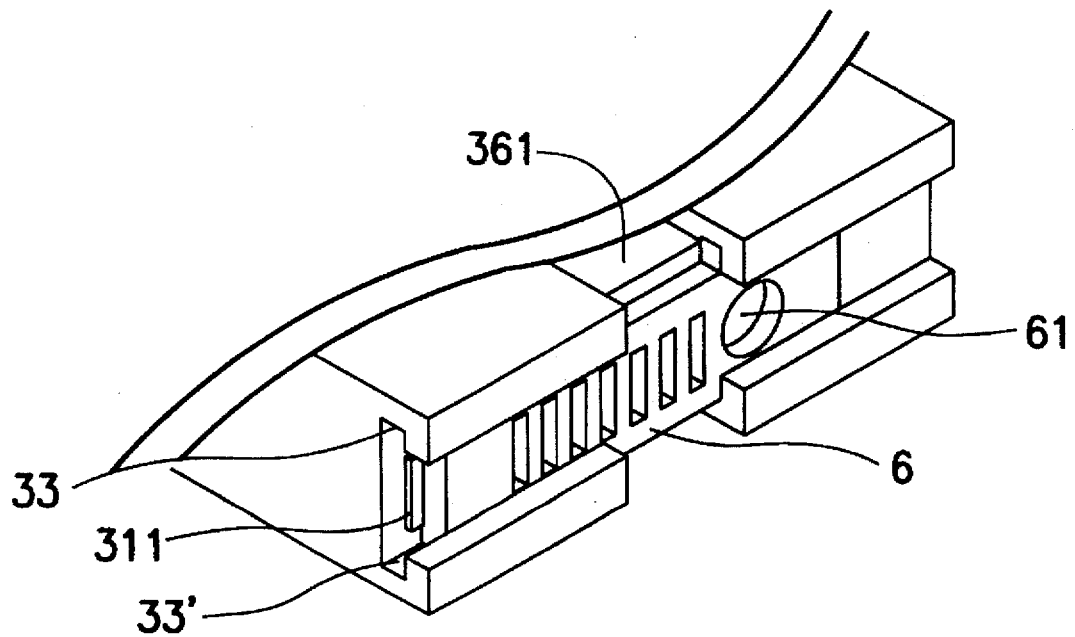
FIG. 10A shows a dust cover covering over the through holes of the shroud.

Generally the dust cover 6 contacts with the stopper 311 and covers the through holes 312 of the shroud 3 to prevent dust from staining the ferrules 4. However, the dust cover 6 is moved towards the right side to expose the through holes 312 when the connector of this invention is used. As shown in FIG. 10B, the through hole 61 of the dust cover 6 is aligned with one of the through holes 312 of the shroud 3. To clean the ferrules 4, the shroud 3 is pushed towards the adapter 7 so that the ferrules 4 can stick out from the through holes 312, 61, as shown in FIG. 11, and the spring 352 around the central bar 35 is compressed by the second side walls of the first and second body portions 1, 2. The first latching lugs of the first and second body portions 1, 2 engage the latching holes 371, 391 so that the shroud 3 is fixed to the first and second body portions 1, 2. After the cleaning job is done, the latching arms of the first and second body portion 1, 2 are pressed so that the first latching lugs disengage the latching holes 371, 391. Then the shroud 3 moves back to its original position because of the restoring force of the spring 352.

The shroud of a conventional connector needs to be dismounted from the optical fiber connector before the ferrules are cleaned. Obviously this invention is more convenient than the prior art for cleaning the ferrules.

Although this invention has been described in its preferred forms and various examples with a certain degree of particularity, it is understood that the present disclosure of the preferred forms and the various examples can be changed in the details of construction. The scope of the invention should be determined by the appended claims and not by the specific examples given herein.

What is claimed is:

1. An optical fiber connector comprising:
a main body having a first side wall, a second side wall, a third side wall opposite the first side wall, a fourth side wall opposite the second side wall, two latching arms, each of which has at least one latching lug, respectively extending out from the first and third side walls, and two receiving bases attached to the second side wall;
two ferrules received in the receiving bases;
an adapter connected to the fourth side wall of the main body, wherein an optical fiber cable extends out from the adapter and is divided into two parts in an interior of the main body, and the two parts of the optical fiber cable are connected to the ferrules; and
a shroud movably enveloping the receiving bases of the main body and having two through holes corresponding to the ferrules and at least one latching hole corresponding to the latching lug, whereby the ferrules can stick out from the through holes and the latching lug can engage into the latching hole to fix the shroud to the main body.

2. An optical fiber connector as claimed in claim 1, further comprising a dust cover movably contacting with the shroud to cover or expose the through holes.

3. An optical fiber connector as claimed in claim 1, wherein the shroud has four side surfaces respectively marked with letters A, B, M, S.

4. An optical fiber connector as claimed in claim 1, further comprising a keying element which is rotatably received in a receiving cavity of the shroud and has an indicating means to indicate the present operation type of the optical fiber connector.

5. An optical fiber connector as claimed in claim 4, wherein the receiving cavity has an upper circular hole, a middle circular hole, a diameter of which is larger than that of the upper circular hole, and a lower arcuate hole; and wherein the keying element has a disk member and a body member which is substantially cylindrical and has an arcuate opening formed on its bottom.

6. An optical fiber connector as claimed in claim 5, wherein there are further three letters A, M, B marked around the receiving cavity of the shroud; the indicating means is an arrow symbol, and the body member of the keying element is received in the upper and middle circular holes when the arrow symbol points to one of the letters A, M, B, and the body member is received in the middle circular hole and the lower arcuate hole when the arrow symbol points to the opposite of the letter M.

7. An optical fiber connector as claimed in claim 6, wherein the disk member of the keying element further has two platforms between which a channel is formed, and the arrow symbol is marked in the channel.

8. An optical fiber connector comprising:
a hollow main body;
two ferrules received in the main body;
an adapter connected to the ferrules through an optical fiber cable; and
a keying element which is rotatably fitted in the main body and has an indicating means to indicate the present operation type of the optical fiber connector.

\* \* \* \* \*